(12) United States Patent
Shan (10) Patent No.: US 11,698,200 B2
(45) Date of Patent: Jul. 11, 2023

(54) AIR DUCT DEVICE AND AIR HANDLING APPARATUS

(71) Applicant: BEIJING XIAOMI MOBILE SOFTWARE CO., LTD., Beijing (CN)

(72) Inventor: Lianyu Shan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 344 days.

(21) Appl. No.: 17/011,926

(22) Filed: Sep. 3, 2020

(65) Prior Publication Data

US 2021/0318006 A1    Oct. 14, 2021

(30) Foreign Application Priority Data

Apr. 9, 2020    (CN) .......................... 202010276429.9

(51) Int. Cl.
| | | |
|---|---|---|
| *F24F 7/06* | (2006.01) | |
| *F24F 13/12* | (2006.01) | |
| *F24F 13/28* | (2006.01) | |
| *F24F 13/30* | (2006.01) | |
| *F24F 1/0035* | (2019.01) | |
| *F24F 13/02* | (2006.01) | |

(52) U.S. Cl.
CPC ............ *F24F 7/065* (2013.01); *F24F 1/0035* (2019.02); *F24F 13/02* (2013.01); *F24F 13/12* (2013.01); *F24F 13/28* (2013.01); *F24F 13/30* (2013.01)

(58) Field of Classification Search
CPC ...... F24F 1/0007; F24F 1/0035; F24F 1/0057; F24F 1/0073; F24F 7/06; F24F 7/065; F24F 11/88; F24F 13/06; F24F 13/08; F24F 13/12; F24F 13/28; F24F 13/30; F24F 13/32

USPC ......................................................... 454/228
See application file for complete search history.

(56) References Cited

U.S. PATENT DOCUMENTS

2019/0360706 A1    11/2019    Zhao et al.

FOREIGN PATENT DOCUMENTS

| | | | | |
|---|---|---|---|---|
| CN | 2861834 Y | 1/2007 | | |
| CN | 106594879 A | 4/2017 | | |
| CN | 107131557 A | 9/2017 | | |
| CN | 107355879 A | 11/2017 | | |
| CN | 108278674 A | 7/2018 | | |
| CN | 108731107 A | * 11/2018 | ............ | F24F 1/0007 |
| EP | 1 079 183 A2 | 2/2001 | | |
| WO | WO 2019/149256 A1 | 8/2019 | | |
| WO | WO-2019149256 A1 | * 8/2019 | ............ | F24F 1/0007 |
| WO | WO 2019/223473 A1 | 11/2019 | | |

OTHER PUBLICATIONS

Extended European Search Report dated Mar. 2, 2021 in corresponding European Patent Application No. 20198115.6, 10 pages.

* cited by examiner

*Primary Examiner* — Allen R. B. Schult
(74) *Attorney, Agent, or Firm* — Oblon, McClelland, Maier & Neustadt, L.L.P.

(57) ABSTRACT

An air duct device and an air handling apparatus are provided. The air duct device can include a housing, a first air duct, and a second air duct. The first air duct is arranged in the housing and has an air input end and an air output end. The second air duct is arranged in the housing and has an air input end and an air output end. The air input end of the second air duct passes by the air output end of the first air duct.

20 Claims, 5 Drawing Sheets

AIR DUCT DEVICE AND AIR HANDLING APPARATUS

CROSS-REFERENCES TO RELATED APPLICATION

This application is based on and claims priority to Chinese Patent Application No. 202010276429.9, filed on Apr. 9, 2020, the entire content of which is incorporated herein by reference.

TECHNICAL FIELD

The present disclosure relates to a field of air treatment technology, including to an air duct device and an air handling apparatus.

BACKGROUND

At present, a single air duct system is widely adopted in an air conditioning industry. For example, an air input and output system of an air conditioner can include one air duct, for temperature and humidity regulations of an indoor environment. However, an existing ventilator directs at purifying an indoor air separately. Thus, a user needs to mount the air conditioner and the ventilator separately. That is, an integrated arrangement is lacked, in which an air duct is shared by the air conditioner and the ventilator for the temperature and humidity regulations of the indoor environment as well as the indoor air purification.

SUMMARY

A first aspect of the present disclosure provides an air duct device. The air duct device can include a housing, a first air duct and a second air duct. The first air duct is arranged in the housing and has an air input end and an air output end. The second air duct is arranged in the housing and has an air input end and an air output end. The air input end of the second air duct passes by the air output end of the first air duct.

A second aspect of the present disclosure further provides an air handling apparatus including an air duct device. The air duct device can include a housing, a first air duct, and a second air duct. The first air duct is arranged in the housing and has an air input end and an air output end. The second air duct is arranged in the housing and has an air input end and an air output end. The air input end of the second air duct passes by the air output end of the first air duct.

Other features and advantages of the present disclosure will be illustrated in subsequent specifications, and partly becomes apparent from the description or is appreciated by the implementation of the present disclosure. The object and other advantages of the present disclosure can be achieved and obtained by a structure specially pointed out in the description and the drawings. The technical solution of the present disclosure is further described in detail with reference to the drawings and exemplary embodiments.

BRIEF DESCRIPTION OF THE DRAWINGS

The accompanying drawings, which constitute a part of this specification, illustrates exemplary embodiments of the disclosure and provides a further understanding of the present disclosure, together with the description, serves to explain the principles of the disclosure, and should not be constituted as a limitation to the present disclosure.

DETAILED DESCRIPTION

The exemplary embodiments of the present disclosure will be described below with reference to the accompanying drawings. It should be understood that the exemplary embodiments described herein are merely configured to illustrate and explain the present disclosure, and should not be construed as a limitation to the present disclosure.

Figure 1:
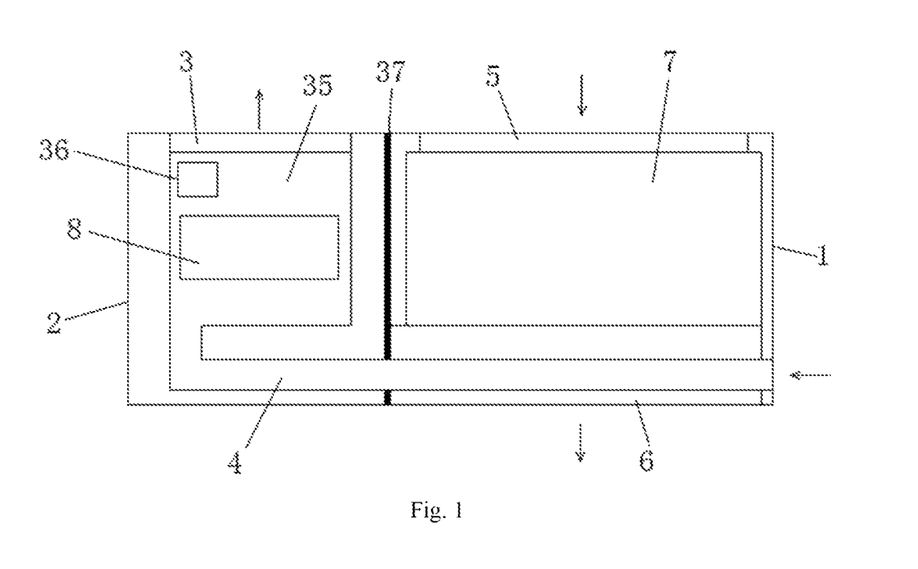
FIG. 1 is a schematic view of an air duct device according to an embodiment of the present disclosure.

As illustrated in FIG. 1, exemplary embodiments of the present disclosure provide an air duct device, including a first air duct 1 and a second air duct 2 arranged in a same housing, and an air input end of the second air duct 2 passes by an air output end of the first air duct 1. An air input end of the first air duct 1 and an air output end of the second air duct 2 are arranged in a same surface of the housing, and an air direction of the air input end of the first air duct 1 is opposite to an air direction of the air output end of the second air duct 2. The housing is provided with a baffle 37 therein, which is configured to isolate the first air duct 1 from the second air duct 2. The baffle 37 is configured to isolate the first air duct 1 from the second air duct 2, such that the air directions of the first air duct 1 and the second air duct 2 will not interfere with each other.

The housing is configured to mount or place the first air duct 1 and the second air duct 2 in an indoor environment, so as to achieve the purpose for ventilation or temperature and humidity regulation to the indoor environment.

The second air duct 2 can be configured to purify air, and the first air duct 1 is configured for heat exchange. With the air input end of the second air duct 2 passing by the air output end of the first air duct 1, an input air of the second air duct 2 can have a heat exchange with the air in the first air duct 1. Thus, a temperature difference of the heat exchange between the air in the second air duct 2 and an indoor air is reduced during air purification, a fluctuation of an indoor temperature is reduced, and an indoor comfort is improved.

The first air duct 1 and the second air duct 2 are arranged in the same housing so as to achieve the purpose of the miniaturization of the mounting structure of the air duct device. In addition, the air input end of the second air duct 2 passes by the air output end of the first air duct 1 such that the second air duct 2 is lengthened, thus facilitating a decrease of the noise of a ventilation system and improving the user experience.

Embodiments of the present disclose further provides an air handling apparatus including an air duct device, and the air duct device includes a first air duct 1 and a second air duct 2 arranged in a same housing. The second air duct 2 is configured to purify air, and the first air duct 1 is configured for heat exchange. With an air input end of the second air duct 2 passing by an air output end of the first air duct 1, an input air of the second air duct 2 can have a heat exchange with the air in the first air duct 1. Thus, a temperature difference of the heat exchange between the air in the second air duct 2 and an indoor air is reduced during air purification, a fluctuation of an indoor temperature is reduced, and an indoor comfort is improved.

The first air duct 1 and the second air duct 2 are arranged in the same housing so as to achieve the purpose of the miniaturization of the mounting structure of the air duct device. In addition, the air input end of the second air duct 2 passes by the air output end of the first air duct 1 such that the second air duct 2 is lengthened, thus facilitating a decrease of the noise of a ventilation system and improving the user experience.

Figure 2:
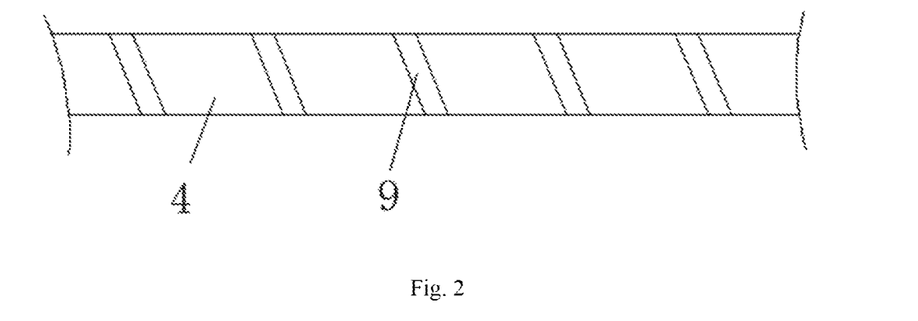
FIG. 2 is a schematic view of a flow deflector according to an embodiment of the present disclosure.
Figure 6:
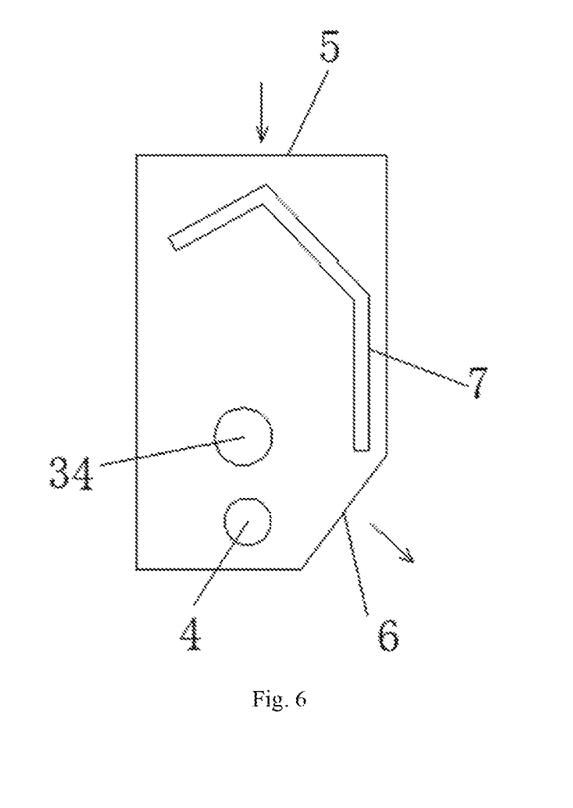
FIG. 6 is a schematic view of a heat exchange unit according to an embodiment of the present disclosure.

As illustrated in FIGS. 1, 2 and 6, the second air duct 2 is a ventilation duct, the air output end of the second air duct 2 includes a fresh air outlet 3, the air input end of the second air duct 2 includes an outdoor air input channel 4, the fresh air outlet 3 is communicated with the outside of the housing, i.e., the indoor environment, and the outdoor air input channel 4 passes through the baffle 37 and goes by the air output end of the first air duct 1.

A purification chamber 35 is arranged between the fresh air outlet 3 and the outdoor air input channel 4. The purification chamber 35 is configured to purify the air introduced from the outdoor air input channel 4 to the purification chamber 35, and then to guide the purified air to the fresh air outlet 3, so as to achieve the purpose of purifying the indoor air finally.

As illustrated in FIG. 1, an air inlet of the outdoor air input channel 4 is located at a side of the air output end of the first air duct 1 away from the second air duct 2, and the air inlet of the outdoor air input channel 4 runs through a side wall of the housing. The air inlet of the outdoor air input channel 4 is formed in the side of the first air duct 1, such that an output air of the first air duct 1 and the input air of the second air duct 2 will not interfere with each other. Thus, a temperature difference between the purified air input from the second air duct 2 to the indoor environment and the indoor air is not relatively large, so as to improve the comfort of a person in the indoor environment.

As illustrated in FIGS. 1 and 6, the purification chamber 35 is provided with a purification filter 8 and a first fan 36. In some embodiments, the purification filter 8 may be a filter screen.

The purification filter 8 can be detached and replaced in the purification chamber 35. When the purification filter 8 needs to be replaced, the purification filter 8 is taken out of the purification chamber 35 and then replaced, so as to ensure a cleanliness of the indoor air. The first fan 36 is configured to introduce an outdoor air from the air inlet (i.e., an outdoor air inlet) of the outdoor air input channel 4 to the purification chamber 35, so as to improve the efficiency of air purification, and then to guide the purified air (i.e., a fresh air) from the purification chamber 35 to the indoor environment via the fresh air outlet 3, so as to achieve the purpose of purifying the indoor air. In some embodiments, the fresh air outlet 3 is communicated with the outside of the housing, i.e. the indoor environment, and an end of the outdoor air input channel 4 away from the fresh air outlet 3 and the purification chamber 35 includes the outdoor air inlet. The outdoor air inlet is configured to introduce the outdoor air to the outdoor air input channel 4, and then the outdoor air input channel 4 guides the outdoor air to the purification chamber 35. The introduced air is purified by the purification filter 8 in the purification chamber 35, and then the purified air is discharged via the fresh air outlet 3, so as to achieve the purpose for purifying the indoor air.

The first fan 36 is configured to introduce the outdoor air at the outdoor air inlet of the outdoor air input channel 4 into the purification chamber 35, the outdoor air is filtered by the purification filter 8 in the purification chamber 35, and then the purified outdoor air is discharged to the indoor environment through the fresh air outlet 3, so as to achieve the purpose of indoor air purification. In other embodiments, the first fan 36 is arranged between the purification filter 8 and the fresh air outlet 3, and the first fan 36 is arranged adjacent to the fresh air outlet 3. By arranging the first fan 36 adjacent to the fresh air outlet 3, the purification chamber 35 discharges the purified outdoor air to the indoor environment, thereby improving the purification efficiency of the second air duct 2.

Further, the first fan 36 can be arranged between the purification filter 8 and the outdoor air input channel 4, such that more air introduced via the outdoor air input channel 4 can enter the purification chamber 35 and is discharged from the fresh air outlet 3 to the indoor environment after being purified by the purification chamber 35. In some embodiments, two first fans 36 are arranged on two sides of the purification filter 8, respectively. One first fan 36 is arranged adjacent to the outdoor air input channel 4, and the other first fan 36 is arranged adjacent to the fresh air outlet 3, such that the outdoor air input channel 4 can introduce more air into the purification chamber 35, and the purified air can be more effectively discharged to the indoor environment by the first fan 36 adjacent to the fresh air outlet 3 after being purified by the purification chamber 35.

The outdoor air input channel 4 passes by the air output end of the first air duct 1. Since the first air duct 1 is a heat-exchange air duct, the first air duct 1 will exchange heat with the outdoor air input channel 4 passing thereby, such that the air flowing from the outdoor air input channel 4 to the fresh air outlet 3 is the air after the heat exchange. Thus, the temperature difference of the heat exchange between the air in the second air duct 2 and the indoor air is reduced during the air purification, the fluctuation of the indoor temperature is reduced, and the indoor comfort is improved.

As illustrated in FIG. 1, the first air duct 1 is the heat-exchange air duct, the air input end of the first air duct 1 includes an inlet 5 of the heat-exchange air duct, the air output end of the first air duct 1 includes an outlet 6 of the heat-exchange air duct, the inlet 5 of the heat-exchange air duct is communicated with the outside of the housing, a heat exchange unit 7 is provided between the inlet 5 of the heat-exchange air duct and the outlet 6 of the heat-exchange air duct, and an air flow after the heat exchange with the heat exchange unit 7 is discharged out of the outlet 6 of the heat-exchange air duct.

The heat exchange unit 7 is configured to guide the gas at the outlet 6 of the heat-exchange air duct for cooling or heating, so as to improve the cooling or heating effect of the first air duct 1 on the indoor air. The first air duct 1 may be applied to an air conditioner. In some embodiments, the heat exchange unit 7 is an air-conditioning heat exchanger with fins.

As illustrated in FIG. 1, an air direction of the outdoor air input channel 4 is perpendicular to an air direction of the outlet 6 of the heat-exchange air duct. The heat exchange unit 7 has a U-shaped structure, an end of the U-shaped structure facing away from an opening thereof is oriented towards the inlet 5 of the heat-exchange air duct, and the outlet 6 of the heat-exchange air duct is arranged adjacent to the opening of the U-shaped structure. A second fan is arranged adjacent to the opening of the U-shaped structure of the heat exchange unit 7 and is fixed inside the housing, and the outdoor air input channel 4 is arranged inside the housing and adjacent to the outlet 6 of the heat-exchange air duct.

The outdoor air input channel 4 is configured as a pipeline, such as a metal pipeline or a plastic pipeline of material consistent with that of the housing. The pipeline may be separately molded or integrally molded with the housing.

Since the air direction of the outdoor air input channel 4 of the second air duct 2 is perpendicular to the air direction of the air output end of the first air duct 1, i.e. a direction of the outdoor air entering the outdoor air input channel 4 is perpendicular to a direction of the air flowing out of the air output end of the first air duct 1, the cold or hot air flowing out of the first air duct 1 can cool or heat the air in the outdoor air input channel 4 of the second air duct 2, thereby achieving the purpose of reducing the temperature difference between the purified air flowing from the second air duct 2 into the indoor environment and the indoor air.

Further, an outer diameter of the outdoor air input channel 4 is smaller than an inner diameter of the outlet 6 of the heat-exchange air duct, such that the air after the heat exchange can be better diffused via the outlet 6 of the heat-exchange air duct. Moreover, after the air passing through the outdoor air input channel 4 is preheated via the outlet 6 of the heat-exchange air duct, the air arriving at the purification chamber can be preheated, so as to further avoid a situation that the temperature difference between the fresh air discharged from the purification chamber and the indoor air is relatively large.

The outdoor air input channel 4 may run through the baffle 37 and the side wall of the housing, and be communicated with an outdoor environment, so as to achieve the introduction of the outdoor air to the purification chamber 35.

An outer side wall of the outdoor air input channel 4 may also be fitted with an inner wall of the housing or an inner wall of the outlet 6 of the heat-exchange air duct, so as to achieve the purpose of preheating the air flowing through the outdoor air input channel 4 by the heat exchange air discharged from the outlet 6 of the heat-exchange air duct. Since the outer diameter of the outdoor air input channel 4 is smaller than the inner diameter of the outlet 6 of the heat-exchange air duct, the outdoor air input channel 4 will not affect the air discharge of the outlet 6 of the heat-exchange air duct.

As illustrated in FIG. 2, a flow deflector 9 is spirally arranged on an inner wall of the outdoor air input channel 4. The flow deflector 9 has a spiral structure, such that the outdoor air in the second air duct 2 can enter the indoor environment from the outdoor air input channel 4 more quickly, so as to improve the efficiency of fresh air replacement.

An electric control module is also provided in the housing. The electric control module is connected with the second fan, the first fan and the heat exchange unit, and configured turn on or off the second fan, the first fan and the heat exchange unit.

In these embodiments, the present disclosure adopts a traditional appearance structure of the air conditioner, and integrates the structure of the ventilate into the housing of the air conditioner, such that the first air duct 1 and the second air duct 2 are mounted to be used by sharing the same housing. Through a joint structure design of the first air duct 1 for the air conditioner and the second air duct 2 for the ventilator, the output air of the indoor air conditioner pre-cools/preheats the outdoor air to enter the indoor environment and, and hence the indoor temperature fluctuation caused when the ventilation system introduces the outdoor air to the indoor environment is reduced. Thus, the indoor temperature fluctuation is decreases, and the temperature difference between the air introduced to the indoor environment by the ventilator and the indoor air. Especially, when the temperature difference between the output air of the air conditioner and the outdoor air is relatively large, the present disclosure can effectively reduce drastic changes of the temperature in the indoor environment due to the introduction of outdoor air by the ventilator, thus effectively improving the comfort of the air input by the ventilator.

Moreover, the air input end of the second air duct 2 passes by the air output end of the first air duct 1 such that the second air duct 2 is lengthened, thus facilitating the decrease of the noise of the ventilation system and improving the user experience.

A fresh air conditioner can use the same air duct system as a traditional cooling/heating air conditioner, which effectively reduces the structure size of the fresh air conditioner, decreases the cost, achieves the heat exchange with the indoor air, reduces the indoor temperature fluctuation, and improves the indoor comfort.

This technical solution can be mainly applied in the domestic air-conditioning scenes, but not limited to the air-conditioning scenes, which can also be applied to domestic air management unit scenes including air purification scenes and ventilator scenes.

Figure 3:
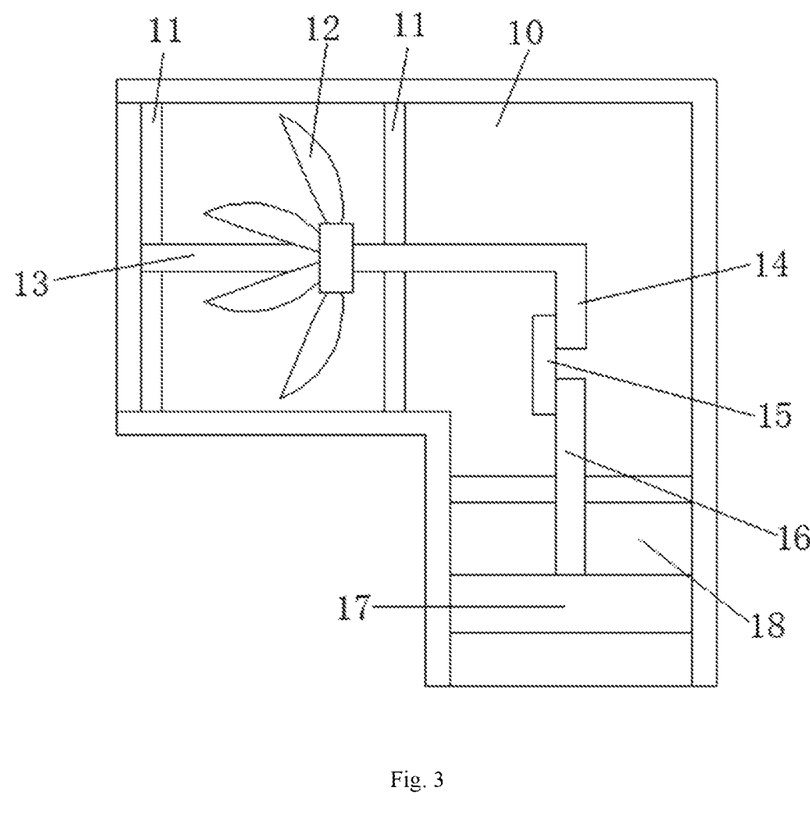
FIG. 3 is a schematic view of a heat-exchange air input channel according to an embodiment of the present disclosure.
Figure 4:
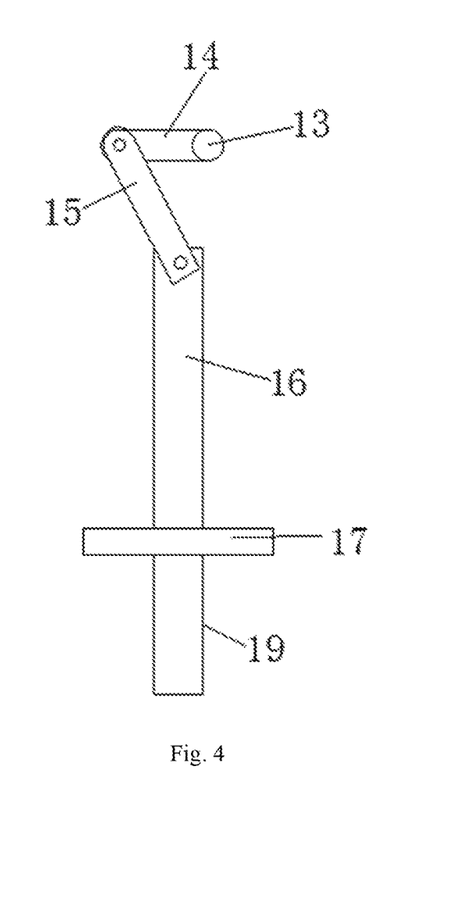
FIG. 4 is a schematic view of a pressurization device according to an embodiment of the present disclosure.

As illustrated in FIG. 3-4, in some embodiments, a heat-exchange air input channel 10 is provided at the inlet 5 of the heat-exchange air duct, and blades 12 and a pressurization device are provided inside the heat-exchange air input channel 10. The blades 12 are located adjacent to an input end of the heat-exchange air input channel 10, and the pressurization device is located adjacent to an output end of the heat-exchange air input channel 10. The blades 12 are fixedly arranged on a first rotating shaft 13, two connecting brackets are arranged on a circumferential outer wall of the first rotating shaft 13 and spaced apart from each other, and the blades 12 are located between the two connecting brackets. The connecting bracket includes a plurality of connecting plates 11 which are evenly distributed around an axial centerline of the first rotating shaft 13.

An end of the connecting plate 11 away from the first rotating shaft 13 is fixed to an inner wall of the heat-exchange air input channel 10, and another end of the connecting plate 11 adjacent to the first rotating shaft 13 is connected to the first rotating shaft 13 through a bearing. The heat-exchange air input channel 10 has an L-shaped structure, one end (i.e. the input end) of the L-shaped structure is arranged at the inlet 5 of the heat-exchange air duct and communicated with the outside of the housing, and the other end (i.e. the output end) of the L-shaped structure is oriented towards the heat exchange unit 7. An end of the first rotating shaft 13 away from the input end of the heat-exchange air input channel 10 is fixedly connected to the pressurization device. The pressurization device includes a first connecting rod 14, a second connecting rod 15 and a piston 17. One end of the first connecting rod 14 is connected with the first rotating shaft 13, the other end of the first connecting rod 14 is rotatably connected with one end of the second connecting rod 15, and the other end of the second connecting rod 15 is rotatably connected with a third connecting rod 16. A piston chamber 18 is provided in the heat-exchange air input channel 10 and adjacent to the output end of the heat-exchange air input channel 10, and a piston 17 configured to reciprocate is arranged in the piston chamber 18. The third connecting rod 16 extends into the piston chamber 18 and is connected to the piston 17.

These embodiments can have beneficial effects. For example, a part of the air at the inlet 5 of the heat-exchange air duct directly flows through the heat exchange unit 7, and another part of the air at the inlet 5 of the heat-exchange air duct first flows through the heat-exchange air input channel 10. The air flowing through the heat-exchange air input channel 10 then drives the blades 12 arranged adjacent to the input end of the heat-exchange air input channel 10 to rotate. After the blades 12 rotate, the pressurization device is started. The pressurization device then pressurizes the air from the inlet 5 of the heat-exchange air duct, and the pressurized air further flows to and through the heat exchange unit 7, such that the air power is increased without increasing the power of an outdoor unit of the air conditioner, thus effectively saving the electric energy and improving the cooling or heating efficiency.

During specific operations, after the air at the inlet 5 of the heat-exchange air duct blows to the heat-exchange air input channel 10, the blades 12 are driven by the air to rotate, and the first rotating shaft 13 also rotates along with the blades 12. After the first rotating shaft 13 rotates, the first connecting rod 14 connected to the other end of the first rotating shaft 13 also rotates along with the first rotating shaft 13. The first connecting rod 14 performs a circular motion around the first rotating shaft 13 and then drives the second connecting rod 15 to rotate, and the second connecting rod 15 further drives the third connecting rod 16 to rotate after rotation. The first connecting rod 14 is rotatably connected with the second connecting rod 15, and the second connecting rod 15 is rotatably connected with the third connecting rod 16, so that the third connecting rod 16 can drive the piston 17 to reciprocate in the piston chamber 18. Thus, the air in the heat-exchange air input channel 10 can be pressurized and advanced towards the heat exchange unit 7, such that the energy of the air flowing from the inlet 5 of the heat-exchange air duct to the heat exchange unit 7 increases, thereby improving the cooling or heating efficiency of the air conditioner.

Figure 5:
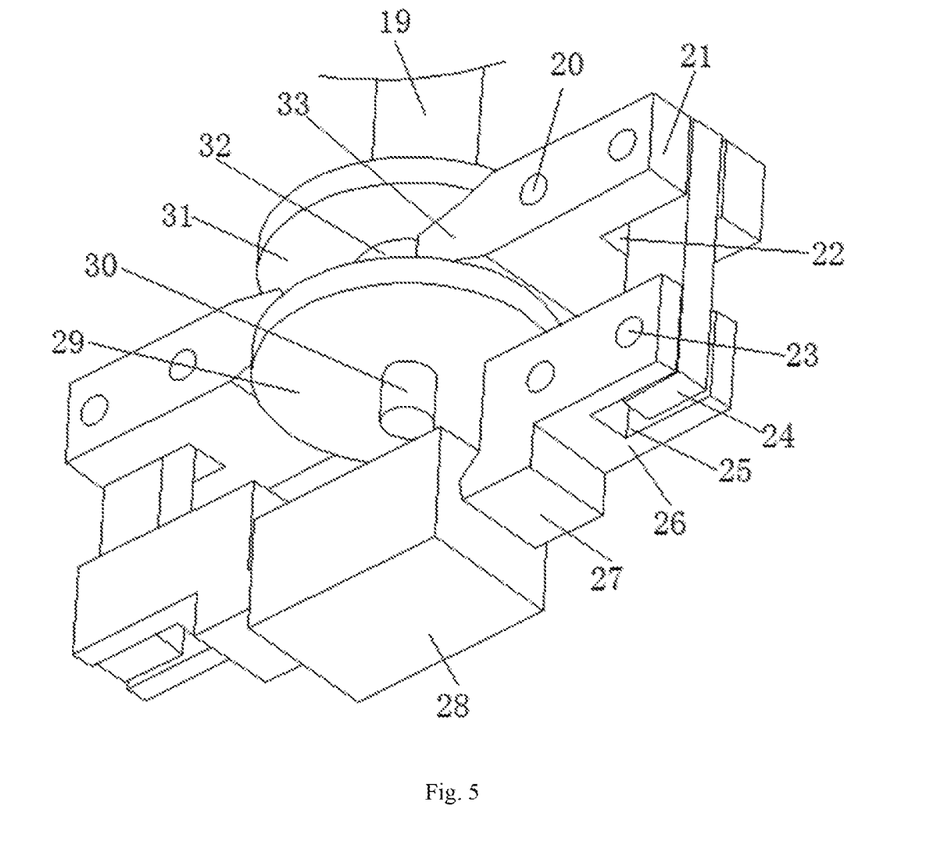
FIG. 5 is a schematic view of a power switching device according to an embodiment of the present disclosure.

As illustrated in FIG. 4-5, in some embodiments, the first air duct 1 is also provided with a heater (not illustrated) therein, the heater is provided with a power switching device, and the power switching device is connected with a surface of the piston 17 away from the third connecting rod 16 and configured to turn on or off the heater. The power switching device includes a fourth connecting rod 19, a first conductive block 27 and a second conductive block 28. One end of the fourth connecting rod 19 is connected with the piston 17, and the other end of the fourth connecting rod 19 is connected with a first disc 31. The first disc 31 is connected with a second disc 29 through a connecting shaft 31 and spaced apart from the second disc 29 by the connecting shaft 31, and an end of the second disc 29 away from the connecting shaft 32 is provided with a third conductive block 30. An engaging block 33 is inserted between the second disc 29 and the first disc 31, and an end of the engaging block 33 away from the second disc 29 and the first disc 31 is connected with a movable group. The movable group and the engaging block 33 are symmetrically arranged with respect to an axial centerline of the fourth connecting rod 19. That is, two movable groups are provided and arranged with respect to the axial centerline of the fourth connecting rod 19, and two engaging block 33 are provided and arranged with respect to the axial centerline of the fourth connecting rod 19.

The movable group includes a first regulating block 21, a second regulating block 24 and a third regulating block 26. Each of the first regulating block 21 and the third regulating block 26 is provided with a first connecting shaft 20 running through two opposite sides thereof, and is rotatably arranged in the first air duct 1 through the first connecting shaft 20. One end of the first regulating block 21 is connected to the engaging block 33, the other end of the first regulating block 21 is provided with a first groove 22, and one end of the second regulating block 24 is rotatably connected in the first groove 22 through a second connecting shaft 23. The first connecting shaft 20 and the second connecting shaft 23 are parallel to each other, and perpendicular to an extending direction of the first regulating block 21 and a movement direction of the fourth connecting rod 19. One end of the third regulating block 26 is provided with the first conductive block 27, the other end of the third regulating block 26 is provided with a second groove 25, and the other end of the second regulating block 24 is rotatably connected in the second groove 25 through another second connecting shaft 23. The second conductive block 28 is arranged in the first air cut 1 and at a side of the third conductive block 30 away from the second disc 29. The third conductive block 30 is configured to be in contact with or disconnected from the second conductive block 28. The first conductive block 27 is also configured to be in contact with or disconnected from the second conductive block 28. The second conductive block 28 is connected to a main power output terminal. The first conductive block 27 is connected with a power input terminal of the heater, and the third conductive block 30 is a ground terminal of the heater.

These embodiments have beneficial effects. For example, the heat exchange unit is configured to guide the cold air or the hot air during cooling or heating, so as to achieve an efficient output of cooling and heating. However, both the air conditioner and the ventilator are connected to the same outdoor unit, and most of the time, the ventilator is normally on during daily use, while the air conditioner is turned on or off according to requirements of a person in the indoor environment. Specially, in a heating mode, if the heater works all the time, the comfort of the person in the indoor environment will be reduced, and the energy waste will also occur. Therefore, through the power switching device, the heater can be switched to be turned on or off separately, so as to avoid the energy waste and the discomfort of the person in the indoor environment caused by fact that the heater cannot be turned off separately when the air conditioner and the ventilator operate together.

During specific operations, as illustrated in FIGS. 4 and 5, when the third connecting rod 16 moves up and down, the third connecting rod 16 drives the piston 17 to move. When the piston 17 moves up and down, the piston 17 drives the fourth connecting rod 19 to move up and down. When the fourth connecting rod 19 moves up and down, the fourth connecting rod 19 drives the second disc 29 and the first disc 31 to move up and down together, and the engaging block 33 arranged between the second disc 29 and the first disc 31 also moves up and down together, such that the movable group connected with the engaging block moves up and down. When the fourth connecting rod 19 moves upwards, the engaging block 33 is driven to move upwards. Since the first regulating block 21 and the third regulating block 26 are both rotatably arranged on the inner wall of the first air duct 1 through the first connecting shaft 20, when the engaging block 33 moves upwards, the first regulating block 21 rotates clockwise around the first connecting shaft 20, then the second regulating block 24 rotatably connected in the first groove 22 of the first regulating block 21 moves downwards, and thus an end of the third regulating block 26 where the second groove 25 is formed is pushed to move downwards together, such that both the first conductive block 27 and the third conductive block 30 are detached from the second conductive block 28, and thereby the heater is power off.

When the power supply is needed, the fourth connecting rod 19 moves downwards, and the engaging block 33 is driven to move downwards. Since the first regulating block 21 and the third regulating block 26 are both rotatably arranged on the inner wall of the first air duct 1 through the first connecting shaft 20, when the engaging block 33 moves downwards, the first regulating block 21 rotates anticlockwise around the first connecting shaft 20, then the second regulating block 24 rotatably connected in the first groove 22 of the first regulating block 21 moves upwards, and thus the end of the third regulating block 26 where the second groove 25 is formed is pushed to move upwards together, such that both the first conductive block 27 and the third conductive block 30 move towards the second conductive block 28 and is in contact with the second conductive block 28, and thereby the heater is power on. The second conductive block 28 is provided with a first conductive metal point, each of the first conductive block 27 and the third conductive block 30 is provided with a second conductive metal point adjacent to the first conductive metal point of the second conductive block 28, and the first conductive metal point and the second conductive metal point are configured to turn on or off the heater through the movement of the power switching device.

The fourth connecting rod 19 is provided with an electromagnet, an end of the piston 17 adjacent to the fourth connecting rod 19 is provided with a paramagnetic block, the electromagnet is connected with a controller, and the controller is connected with the electromagnet and the heater. When the power switching device needs to be started, the electromagnet is first turned on to operate by the controller, such that the electromagnet can absorb and be connected with the paramagnetic block of the piston 17. The piston 17 drives the fourth connecting rod 19 to move when moving, and the movement of the fourth connecting rod 19 enables the power switching device to turn on or off of the heater. When the controller cuts off the magnetism of the electromagnet after the heater is turned on, the electromagnet is disconnected from the paramagnetic block of the piston 17, such that the power switching device is powered on.

When the heater needs to be turned off, the controller turns on the electromagnet to operate, and the fourth connecting rod 19 is adsorbed on the paramagnetic block of the piston 17, such that the power switching device is powered off due to the up movement of the piston 17, and thus the heater is powered off.

Obviously, those skilled in the art can make various changes and modifications to the present disclosure without departing from the spirit and scope thereof. Thus, if these changes and modifications of the present disclosure fall within the scope of the claims of the present disclosure and the equivalent technologies, the present disclosure also intends to include these changes and modifications.

The invention claimed is:

1. An air duct device, comprising:
a housing;
a first air duct that is arranged in the housing and having an air input end and an air output end; and
a second air duct that is arranged in the housing and having an air input end and an air output end, and the air input end of the second air duct passing by the air output end of the first air duct,
wherein the air input end of the second air duct includes an outdoor air input channel that passes through the first air duct and by the air output end of the first air duct,
an air direction of the outdoor air input channel is perpendicular to an air direction of the outlet of the first air duct,
wherein the first air duct is isolated from the second air duct,
wherein the air output end of the first air duct, the air output end of the second air duct, and the air input end of the first air duct communicate air with an indoor environment.

2. The air duct device according to claim 1, wherein the air input end of the first air duct and the air output end of the second air duct are formed in a same surface of the housing, and an air direction of the air input end of the first air duct is opposite to an air direction of the air output end of the second air duct.

3. The air duct device according to claim 1, wherein the housing is provided with a baffle therein, and the baffle is configured to isolate the first air duct from the second air duct.

4. The air duct device according to claim 3, wherein:
the second air duct is a ventilation duct, the air output end of the second air duct includes a fresh air outlet that is in communication with the indoor environment, and
the outdoor air input channel that passes through the baffle.

5. The air duct device according to claim 4, wherein the outdoor air input channel has an air inlet located at a side of the air output end of the first air duct away from the second air duct, and the air inlet of the outdoor air input channel runs through a side wall of the housing to be in communication with an outdoor environment.

6. The air duct device according to claim 4, wherein a purification chamber is provided between the fresh air outlet and the outdoor air input channel.

7. The air duct device according to claim 6, wherein the purification chamber is provided with a purification filter and a first fan therein.

8. The air duct device according to claim 4, wherein the first air duct is a heat-exchange air duct, the air input end of the first air duct includes an inlet of the heat-exchange air duct, the air output end of the first air duct includes an outlet of the heat-exchange air duct, and the inlet of the heat-exchange air duct is in communication with an outside of the housing.

9. The air duct device according to claim 8, wherein a heat exchange unit is provided between the inlet of the heat-exchange air duct and the outlet of the heat-exchange air duct, and is configured to exchange heat with an air flow before the air flow is discharged out of the outlet of the heat-exchange air duct.

10. The air duct device according to claim 9, wherein the heat exchange unit has a U-shaped structure with an end of the U-shaped structure facing away from an opening thereof is oriented towards the inlet of the heat-exchange air duct, and the outlet of the heat-exchange air duct is arranged adjacent to the opening of the U-shaped structure.

11. The air duct device according to claim 10, wherein a second fan is provided adjacent to the opening of the U-shaped structure of the heat exchange unit and is fixed inside the housing, and the outdoor air input channel is arranged inside the housing and adjacent to the outlet of the heat-exchange air duct.

12. The air duct device according to claim 9, further comprising:
- a heat-exchange air input channel that is arranged at the inlet of the heat-exchange air duct, and having an input end and an output end;
- blades that are arranged in the heat-exchange air input channel and adjacent to the input end of the heat-exchange air input channel; and
- a pressurization device that is arranged in the heat-exchange air input channel and adjacent to the output end of the heat-exchange air input channel.

13. The air duct device according to claim 12, further comprising:
- a first rotating shaft, the blades being fixedly arranged on the first rotating shaft, an end of the first rotating shaft away from the input end of the heat-exchange air input channel being fixedly connected to the pressurization device; and
- two connecting brackets that are arranged on a circumferential outer wall of the first rotating shaft and spaced apart from each other, the blades being located between the two connecting brackets,
- wherein the connecting bracket includes a plurality of connecting plates which are evenly distributed around an axial centerline of the first rotating shaft, an end of the connecting plate away from the first rotating shaft is fixed to an inner wall of the heat-exchange air input channel, and another end of the connecting plate adjacent to the first rotating shaft is connected to the first rotating shaft through a bearing.

14. The air duct device according to claim 12, wherein the heat-exchange air input channel has an L-shaped structure, an input end of the L-shaped structure is arranged at the inlet of the heat-exchange air duct and communicates with the outside of the housing, and an output end of the L-shaped structure is oriented towards the heat exchange unit.

15. The air duct device according to claim 13, wherein the pressurization device further comprises:
- a first connecting rod having an end connected with the first rotating shaft;
- a second connecting rod having an end rotatably connected with another end of the first connecting rod;
- a third connecting rod having an end rotatably connected with another end of the second connecting rod;
- a piston chamber that is provided in the heat-exchange air input channel and adjacent to the output end of the heat-exchange air input channel; and
- a piston that is received in the piston chamber and configured to reciprocate in the piston chamber, the third connecting rod having another end extending into the piston chamber and connected to the piston.

16. The air duct device according to claim 15, further comprising a heater arranged in the first air duct, wherein the heater is provided with a power switching device, and the power switching device is connected with a surface of the piston away from the third connecting rod and configured to turn on or off the heater.

17. The air duct device according to claim 16, wherein the power switching device further comprises:
- a fourth connecting rod having an end connected with the piston;
- a first disc connected with another end of the fourth connecting rod;
- a second disc that is connected with the first disc through a connecting shaft and spaced apart from the first disc by the connecting shaft;
- an engaging block that is inserted between the second disc and the first disc; and
- a movable group that is connected with an end of the engaging block away from the second disc and the first disc.

18. The air duct device according to claim 17, wherein:
- the movable group further comprises a first regulating block, a second regulating block, and a third regulating block,
- each of the first regulating block and the third regulating block is provided with a first connecting shaft running through two opposite sides thereof, and is rotatably arranged in the first air duct through the first connecting shaft,
- the first regulating block has an end connected to the engaging block and another end provided with a first groove, and the second regulating block has an end rotatably connected in the first groove through a second connecting shaft, and
- the third regulating block has an end provided with a second groove, and the second regulating block has another end rotatably connected in the second groove through another second connecting shaft.

19. The air duct device according to claim 18, the power switching device further comprising a first conductive block, a second conductive block, and a third conductive block, wherein:
- the first conductive block is arranged to another end of the third regulating block, the third conductive block is arranged to an end of the second disc away from the connecting shaft, and the second conductive block is arranged at a side of the third conductive block away from the second disc,
- the second conductive block is connected to a main power output terminal, the first conductive block is connected with a power input terminal of the heater, and the third conductive block is a ground terminal of the heater, and
- the third conductive block is configured to be in contact with or disconnected from the second conductive block, and the first conductive block is also configured to be in contact with or disconnected from the second conductive block.

20. An air handling apparatus, comprising an air duct device, wherein the air duct device comprises:
- a housing;
- a first air duct arranged in the housing and having an air input end and an air output end; and
- a second air duct arranged in the housing and having an air input end and an air output end, and the air input end of the second air duct passing by the air output end of the first air duct,
- wherein: the air input end of the second air duct includes an outdoor air input channel that passes through the first air duct and by the air output end of the first air duct,
- an air direction of the outdoor air input channel is perpendicular to an air direction of the outlet of the first air duct,
- wherein the first air duct is isolated from the second air duct,
- wherein the air output end of the first air duct, the air output end of the second air duct, and the air input end of the first air duct communicate air with an indoor environment.

* * * * *